United States Patent [11] 3,610,228

[72] Inventor Eugene Temkin
Long Beach, Calif.
[21] Appl. No. 607,767
[22] Filed Jan. 6, 1967
[45] Patented Oct. 5, 1971
[73] Assignee The Birtcher Corporation
Los Angeles, Calif.

[54] APPARATUS FOR MEASURING BODY FLUID PRESSURE
1 Claim, 6 Drawing Figs.
[52] U.S. Cl. .................................................. 128/2.05 D,
73/398
[51] Int. Cl. ......................................................... A61b 5/02
[50] Field of Search ............................................ 128/2.05,
194, 215, 218.1 P, 214, 2.05 D, 2.05 E; 73/388, 398

[56] References Cited
UNITED STATES PATENTS
| | | | |
|---|---|---|---|
| 2,535,998 | 12/1950 | Bierman | 128/2.05 X |
| 2,600,324 | 6/1952 | Rappaport | 128/2.05 X |
| 2,625,153 | 1/1953 | Baum | 128/2.05 |
| 2,866,453 | 12/1958 | Jewett | 128/2.05 |
| 2,976,865 | 3/1961 | Shipley | 128/2.05 |
| 3,122,136 | 2/1964 | Murphy | 128/2.05 |
| 3,172,406 | 3/1965 | Bird et al. | 128/194 |
| 3,183,722 | 5/1965 | Unger et al. | 73/388 |
| 3,380,448 | 4/1968 | Sadove et al. | 128/215 |

*Primary Examiner*—Richard A. Gaudet
*Assistant Examiner*—Kyle L. Howell
*Attorney*—Robert E. Geauque ABSTRACT: The apparatus for measuring body fluid pressure consists of a three-way stopcock in which any two of the three arms may be connected together at any one time. One arm of the stopcock is connected to body pressure through a tube and a second arm is connected to a chamber containing a small pressure-sensitive transducer. A third arm is connected containing a sealable passage through which sterile saline solution is introduced to the tube and chamber and which also connects atmospheric pressure to the chamber for calibration purposes. The third passage can be closed by a self-resealable plug which permits the injection of an anticoagulant into the apparatus.

EUGENE JEMKIN
INVENTOR.

BY R.E. Geanque
ATTORNEY

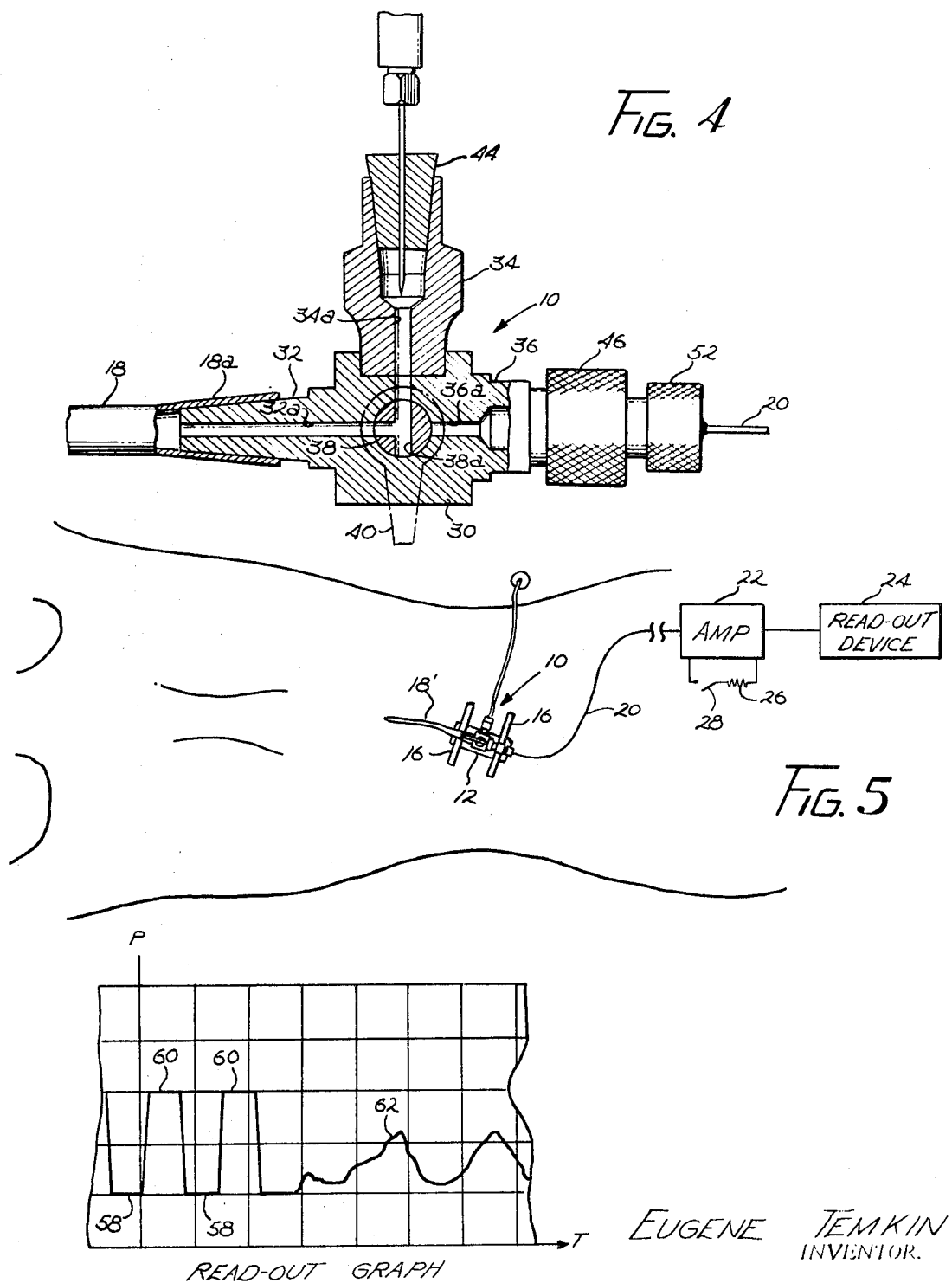

APPARATUS FOR MEASURING BODY FLUID PRESSURE

This invention relates to medical apparatus, and, more particularly, to apparatus for measuring continuously or intermittently, as desired, internal body fluid pressure, such as blood pressure or spinal fluid pressure.

Although there has long been a need for indirect means of continuously or intermittently measuring blood pressure automatically, such as by automatic inflation of blood pressure cuffs and audio pickups to record the pressure, practical means have not been developed thus far. Such means as have been developed have not been practical from the standpoint of reliability, instrumentation, and accuracy.

Several direct methods of continuously or intermittently measuring blood pressure, involving direct contact of the apparatus with the patient's blood, have been developed, but these have had several drawbacks. In one technique, one end of a long polyethylene or Teflon tube filled with an aqueous solution is inserted into the patient's artery or other blood vessel. The other end of the tube is connected to a pressure-sensitive transducer. The plastic tube is quite inelastic and the column of fluid transmits the pressure pulses through the tube to the transducer. This technique has several disadvantages. First, the adjustment of the transducer is a very complicated procedure. Its accuracy and sensitivity depend upon careful adjustment and balance. Second, the length of the plastic tube which transmits the pressure through the column of water determines the accuracy of the instrument. Third, the equipment required is bulky and requires specially trained laboratory personnel to use it effectively. Fourth, in open heart surgery many feet of tubing are added to the already complex equipment required. Fifth, patient movement and manipulation of the tubing constitutes a patient hazard, since he may pull the tubing out of the blood vessel, and the accuracy of the readings may be adversely affected.

Another known technique involves the use of a pressure transducer mounted in that end of a tube that is inserted into a patient's blood vessel. Although this technique does avoid several of the disadvantages of the first technique mentioned, it is still not possible to calibrate the apparatus to atmospheric pressure without removing the pressure transducer from the patient's blood vessel.

The present invention obviates the foregoing disadvantages of prior art devices. This is accomplished by utilizing valve means such as a three-way stopcock, which is adapted to be fixed on the patient's body near the point at which the pressure is being measured. The stopcock may be mounted on a small plate and secured to a patient's arm or leg by means of adhesive tape. It can also be plugged into a spinal needle in the case of measuring spinal fluid pressure.

The stopcock has three arms, each having a passage therethrough, with any two of the arms being connectable together at any time by means of a rotatable valve having an external handle for rotating the valve. One the arms is connected to a short length of plastic tubing which is inserted into the patient's body (into, for example, an artery) where it is desired to measure pressure transmitted through a fluid. A second one of the arms may be utilized for introducing an anticoagulant into the apparatus, and for calibrating the system to atmospheric pressure. The third arm is directly connected to a contained pressure transducer.

The transducer, which is an exceedingly small interface, is mounted in the third arm of the stopcock and is thus very close to the point at which pressure is to be measured. Only a single small diameter cable is used to electrically connect the transducer to a suitable amplifier which is connected into a recording apparatus such as a recording galvanometer or a standard electrocardiograph. Various utilization means may be used, such as high and low limit alerting devices, and the invention is in no way limited to the use of any particular device or equipment.

By requiring only the use of a single small lead from the patient's body to the utilization equipment, the apparatus of the invention becomes particularly adaptable to use during operations where the operating room is crowded with equipment, and any additional complexities should be held to a minimum. The apparatus does not require the use of laboratory personnel to operate it. It can be calibrated and operated by a nurse with a minimum of special training.

The invention, together with further features and advantages, will be better understood from the following description, taken in conjunction with the accompanying drawings, in which:

FIG. 4 is a partially sectional plan view of the apparatus of the invention showing the stopcock valve in a position to permit injection of a fluid into the apparatus;

FIG. 5 is a plan view showing the apparatus mounted on a patient's back for measuring spinal fluid pressure; and FIG. 6 is a sample graph from utilization equipment showing calibration marks.

Figure 1:
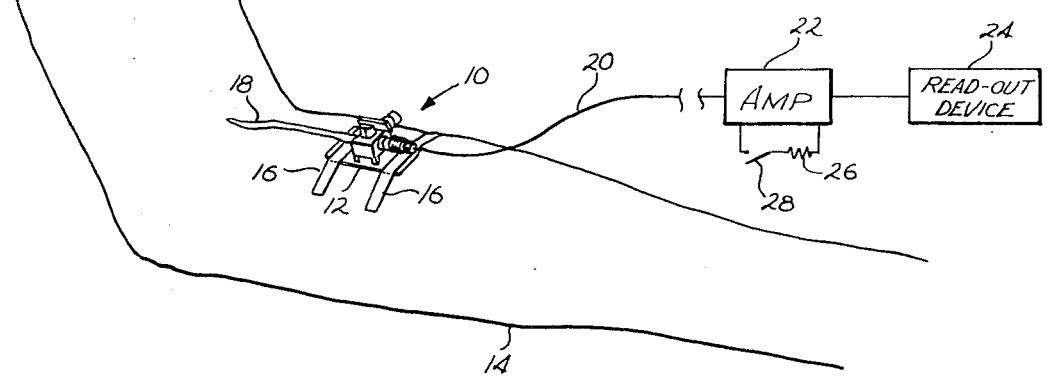
FIG. 1 is a perspective view of the apparatus of the invention mounted on a patient's forearm.

As shown in FIG. 1, the apparatus embodying the invention comprises valve means such as a three-way stopcock, indicated generally by the numeral 10, which is mounted on a small plate 12. The plate 12 is secured to a forearm 14 of a patient by means of adhesive tape 16. One arm of the stopcock 10 is connected to one end of a catheter or plastic tube 18, whose other end is inserted into a vein, artery, a spinal canal in the patient. A thin cable 20 leads from another arm of the stopcock 10 to the input of a suitable amplifier 22, whose output is connected to a readout device 24, such as an electrocardiograph or an oscilloscope.

The amplifier 22 may contain a conventional electrical bridge, which is balanced when the signal thereto from the stopcock 10 is zero. A standard resistor 26 of a desired value may be connected across one leg of the bridge through a switch 28 to serve as a calibration means. For example, the value of the resistor 26 may be so choosen that, when no signal is received from the stopcock 10 and the switch 28 is closed, the readout device may indicate a reading corresponding to 100 to 150 mm. of mercury or any other suitable pressure range that is desired. Thus, when the connection between the stopcock 10 and the patient's fluid is closed off, a direct connection to the atmosphere is made so as to permit a calibration to zero. The amplifier is entirely conventional, and serves merely to amplify any output signal from the bridge.

The readout device 44 may be a conventional recording galvanometer, and electrocardiograph, or other device that preferably provides a permanent record of the pressure being measured. The bridge and amplifier and the readout device comprise utilization means.

Figure 2:
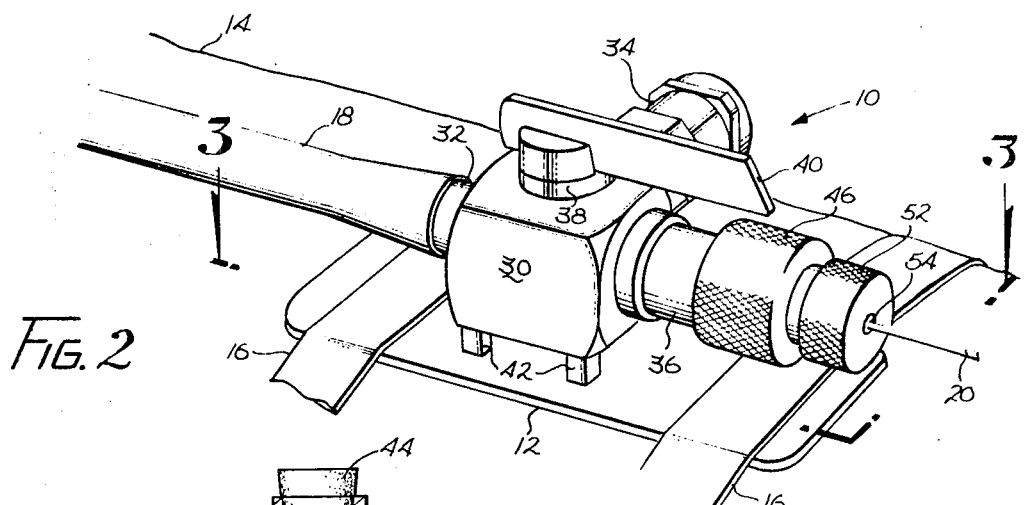
FIG. 2 is a perspective view of a stopcock embodying the invention.
Figure 3:
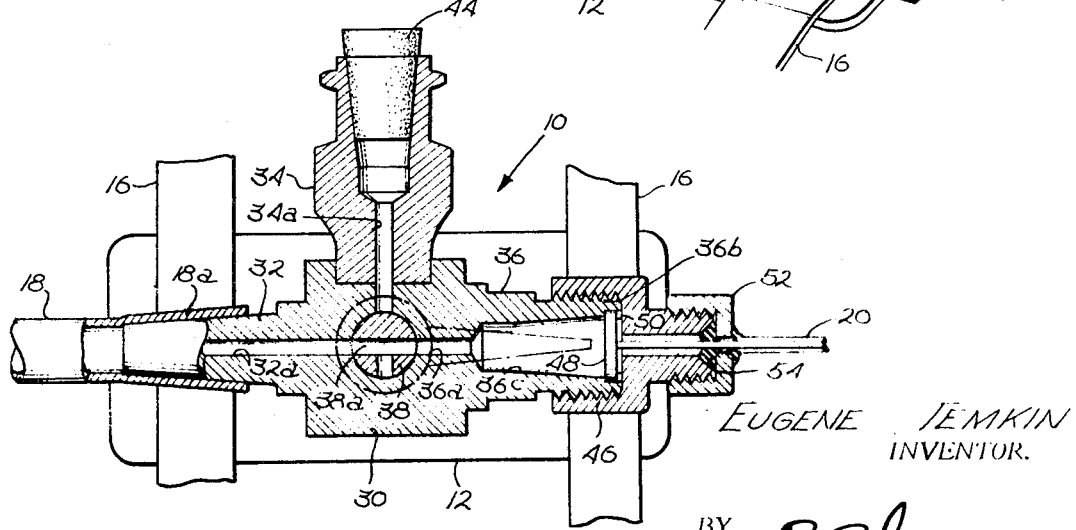
FIG. 3 is a horizontal sectional view taken on the line 3—3 of FIG. 2.

FIGS. 2 and 3 illustrate the three-way stopcock 10 in detail. As shown, the stopcock includes a central body member 30, three arms 32, 34, and 36 disposed 90° apart, and a central rotatable valve member 38 provided with a handle 40 for turning the valve member. The stopcock 10 is secured to the plate 12 by screws (not shown) extending through spacers 42, or by other suitable means. The method of mounting the stopcock on the plate is of no particular importance, however. The arms 32, 34, and 36 are provided with central passages 32a, 34a, and 36a, respectively, which communicate within the valve member 38. The valve member 38 is provided with a T-shaped passage 38a, so that any two of the passages 32a, 34a, 36a may be connected together at any one time. Stops are provided so that all three passages 32a, 34a, 36a, cannot be connected together.

The plastic tube 18 and its appropriate connecting adapter fit over the end of the arm 32 with an airtight seal. The passage 34a in the arm 34 is closed by closure means such as a stopper or a plug 44 with a rubber cap or the like through which a hypodermic needle may be inserted (see FIG. 4) but which is self-resealable and closes off the passageway 34a from the atmosphere.

Three-way stopcocks of the type utilized in the present invention are well known and are available as standard equipment from any medical supply house. Various models may differ from each other in minor details, and it is to be understood that the stopcock 10 shown herein is for purposes of illustration only, and the invention is in no way limited to the use of that particular design or construction.

Referring again to FIGS. 2 and 3, it is seen that the external end of the arm 36 of the stopcock 10 is externally threaded, as at 36b, and an adapter 46 is threaded onto the arm 36. The opening 36a in the arm is enlarged as shown at 36c and is constructed to receive the small pressure-sensitive transducer 48, which is of conventional, well-known design. The pressure forces exerted by the column of fluid on the transducer's surface develop a voltage which is proportional to the force exerted upon it. This charge is transmitted to the amplifier 22 and thus provides a signal to the readout device 24.

To assemble the apparatus for use, all the air is removed from the stopcock, so that it does not cushion any force exerted against the transducer 48, by connecting a syringe filled with sterile saline to the arm 34. The passageways are then filled with the saline by rotating the valve 38. After the passageways 34a, 38a, 36a, and 36c are filled with saline, the transducer 48 is dipped into the fluid and secured in place. The tube 18 is connected to the patient in the desired manner and quickly fills with blood or other body fluid. It is then connected to the arm 32 of the stopcock 10, and with the stopcock 38 in a position connecting passageways 34a and 32a, the saline is injected through the arm 34 and 32 and into the tubing 18 so as to clear the blood from it and return it to the patient's body. This last procedure is not necessary in the case of measurements involving noncoagulating body fluids. A suitable plug 44 or cap may now be placed on arm 34. An anticoagulant such as Heparin may then be introduced with a syringe and needle through the plug or cap 44 and will fill the tube 18 so as to provide a noncoagulating interface between the blood and the fluid in the tubing. The valve may then be turned to connect the passages 32a and 36a and the apparatus is ready for use except for calibration.

The pressure measuring apparatus of the invention may be calibrated intermittently as desired by rotating the valve 38 to connect the passages 34a and 36a, and then removing the plug or cap 44 from the arm 34. This subjects the transducer 48 to atmospheric pressure through the saline column in the arms 34 and 36, and serves to establish the zero base line. The readout device 24 can then be adjusted to read zero under this condition with the valve still connecting the passages 34a and 36a. The switch 28 can then be closed and deflection calibration of the readout device adjusted to its correct sensitivity for the range of pressures desired. The valve 38 is then rotated to connect the passages 32a and 36a, the passage 34a is refilled with saline if necessary, and the plug or cap 44 is replaced in the arm 34. The apparatus is now ready for use.

FIG. 6 illustrates a typical graph that might be obtained from the readout device 24. As shown in the FIG., portion 58 of the curve represents the base line calibration, when the transducer is connected to the atmosphere through the saline column and arm 34 of the stopcock. Portion 60 of the curve represents the output when the switch 28 is closed to represent a given pressure in terms of mm. of mercury or water as the case may be. The portion 62 represents the recorded reading of the patient's fluid pressure with the passages 32a and 36a connected together.

FIG. 5 shows the apparatus of the invention applied to the measurement of a patient's spinal fluid pressure. The apparatus is attached to the standard customarily used spinal needle 18' (in the fashion of the tube 18 in FIGS. 1–3). The spinal needle is previously inserted into the spinal canal by the operator, and the spinal fluid will now emit from the needle's external end. No modification of the apparatus is necessary to measure and record spinal fluid pressures, although the apparatus may be recalibrated for the suitable pressure range of spinal fluid dynamics. During the measurement, spinal fluid samples as customarily taken may be removed through the arm 34 by turning the valve 38. After sampling is done, the valve 38 is again turned so as to connect passageways 32a and 36a and to measure the final pressures after withdrawal of specified amounts of spinal fluid.

It is now apparent that the apparatus of the invention fills a long-felt need in the art. It avoids the use of long lengths of tubing by being located very close to the point of the patient's body where pressure is being measured. The apparatus is compact and light in weight and is easily operated, and is connected to the utilization means only by a small cable. Anticoagulants can be readily introduced into the apparatus to prevent clotting and consequent false readings and/or inoperability. It can monitor fluid pressure continuously or intermittently, as is desired, and can be calibrated without removing the connection from a patient's body for extended periods of time.

Although one embodiment has been illustrated and described in detail, it is apparent that many changes and modifications can be made therein without departing from the true scope and spirit of the invention.

What is claimed is:

1. Apparatus for measuring the pressure of a body fluid comprising:
   a body member including first, second and third conduit arms;
   a three-way valve positioned in said body member and being positionable to interconnect any two of said first, second and third conduit arms;
   means connected to said first arm and being in communication with said body fluid for directing the pressure of the body fluid to said valve;
   a chamber disposed in communication with aid second conduit arm;
   sealable passage means connected to said third arm for introducing saline solution into said connecting means when said valve connects said first and third arms and into said chamber when said valve connects said second and third arms and for connecting atmospheric pressure to said chamber when said valve connects said second and third arms;
   a pressure-sensitive transducer located in said chamber for providing output signals indicative of the pressure of the body fluid when said valve connects said first and second arms;
   circuit means connected to said pressure-sensitive transducer for producing an indication of the magnitude of the output signal received from said pressure-sensitive transducer; and
   a self-resealable plug for selectively sealing said passage means and permitting injection of an anticoagulant therethrough.